Figure 1:
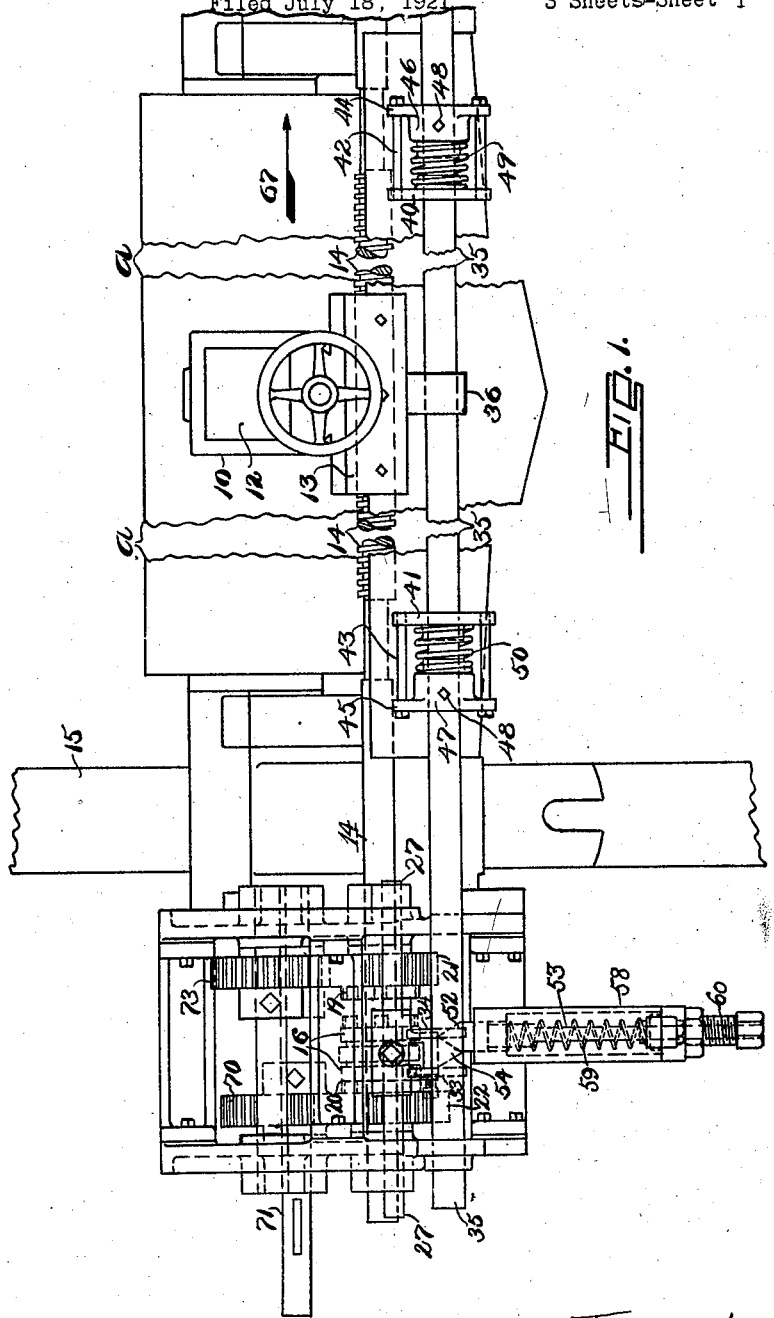

Dec. 23, 1924.

L. O. RAMSDELL

CLUTCH MECHANISM

Filed July 18, 1921

1,520,209

3 Sheets-Sheet 1

Inventor:
Lyndon O. Ramsdell
by Jas. H. Churchill
Atty.

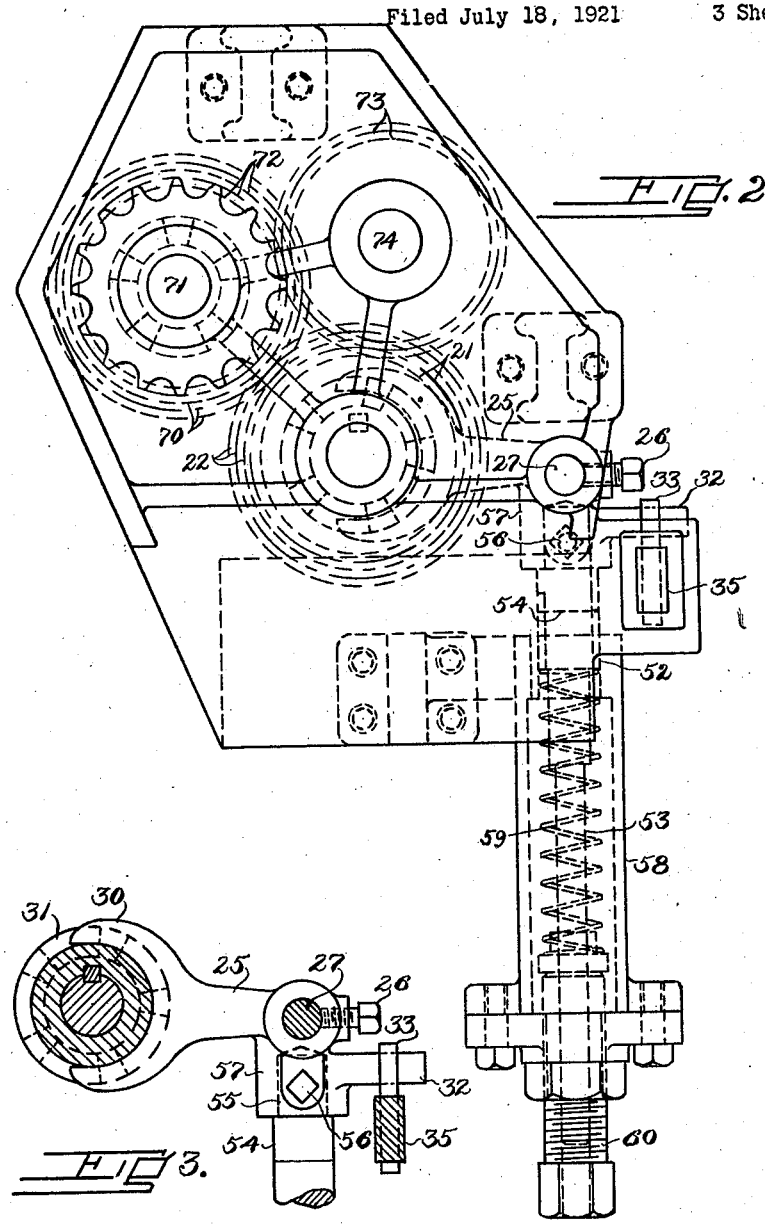

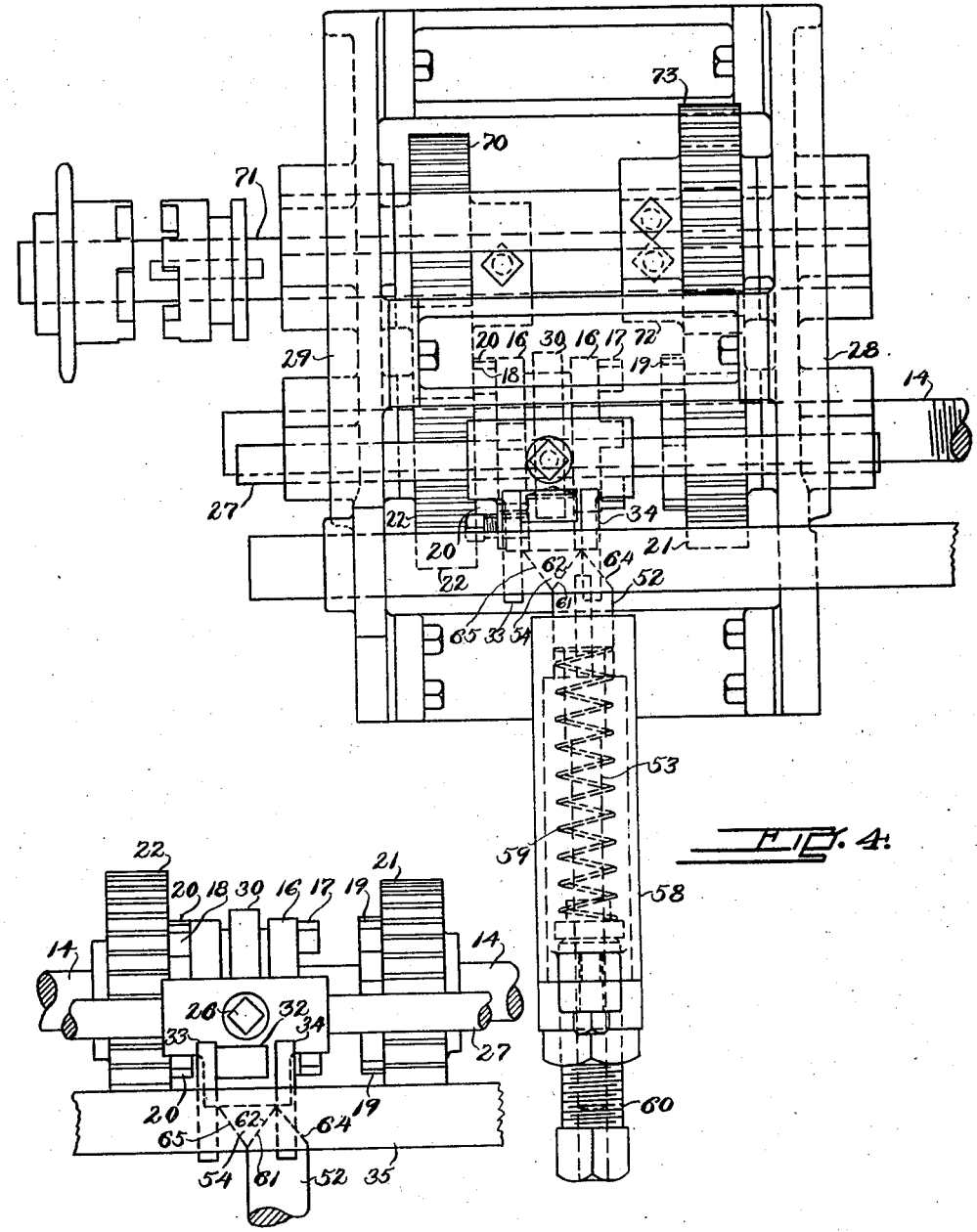

Patented Dec. 23, 1924.

1,520,209

UNITED STATES PATENT OFFICE.

LYNDON O. RAMSDELL, OF DANVERS, MASSACHUSETTS, ASSIGNOR TO THE TURNER TANNING MACHINERY COMPANY, OF PEABODY, MASSACHUSETTS, A CORPORATION OF MAINE.

CLUTCH MECHANISM.

Application filed July 18, 1921. Serial No. 485,631.

*To all whom it may concern:*

Be it known that I, LYNDON O. RAMSDELL, a citizen of the United States, residing in Danvers, in the county of Essex and State of Massachusetts, have invented an Improvement in Clutch Mechanism, of which the following description, in connection with the accompanying drawings, is a specification, like characters on the drawings representing like parts.

This invention relates to clutch mechanisms and is herein shown as embodied in a clutch mechanism of that character in which a clutch member is located between cooperating members and is alternately engaged with the latter to produce rotation in opposite directions of the shaft on which the movable or shiftable clutch member is mounted.

The present invention has for its object to provide a positive and more reliable clutch mechanism of the character described.

To this end, the movable clutch member has cooperating with it mechanism for initially moving it a part of its travel, and auxiliary mechanism for completing its movement preferably at an increased speed and independently of the mechanism which effects its initial movement.

The invention is herein shown as embodied in a machine for working hides, skins and leather, provided with a reciprocating grinder for maintaining the blades or vanes of a working cylinder sharp and in good working condition.

The particular features of the invention will be pointed out in the claims at the end of this specification.

Fig. 1 represents in elevation a portion of a leather working machine provided with a clutch mechanism embodying this invention.

Fig. 2, an end elevation on a large scale looking toward the right in Fig. 1.

Fig. 3, a detail of the clutch mechanism shown in Fig. 1.

Fig. 4, an elevation on a larger scale of the driving mechanism shown in Fig. 1 and of the clutch mechanism for controlling it, and Fig. 5, a detail of the clutch mechanism to be referred to.

Referring to Fig. 1, *a* represents the bladed cylinder of a hide and leather working machine of known construction, which is equipped with a grinder of known construction and comprising a holder 10 for a brick 12 of emery or other suitable material which engages the blades of the rotating cylinder *a*, a hub or sleeve 13 to which the holder 10 is attached, a screw threaded shaft 14 upon which the hub 13 is mounted and engaged therewith to be reciprocated by rotation of the screw shaft 14 in a manner well understood. The screw shaft 14 is mounted in bearings in the side frames 15 of the machine and has splined to it a clutch member 16, shown best in Fig. 5, and provided on its opposite sides with teeth or projections 17, 18, which cooperate with like teeth or projections 19, 20 on gears 21, 22, loosely mounted on the screw shaft 14.

The clutch member 16 is designed to be engaged with the gear 21 when the shaft 14 is to be rotated in one direction to move the grinder 10 in one direction lengthwise of the cylinder *a* and to be engaged with the gear 22 when the grinder is to be moved in the opposite direction. The movable clutch member 16 is shifted on the screw shaft 14 first in one direction and then in the opposite direction by means of a clutch engaging arm 25, fastened by a set screw 26 on a rod 27 mounted to slide in suitable supports 28, 29 attached to the framework of the machine.

The clutch engaging arm 25 is provided with forks 30 which enter an annular groove 31 in the movable clutch member 16 and is also provided with a lug or finger 32 which extends between two pins 33, 34 carried by a bar 35 extended across the machine and suitably mounted in the framework to slide therein, and said bar, which may be designated the shipper bar, is moved by a lug or projection 36 on the hub or sleeve 13 of the grinder, which engages suitable devices carried by the shipper bar 35 when the grinder reaches the end of its travel in opposite directions.

In the present instance the devices engaged by the lug or projection 36 are shown as collars 40, 41 mounted on the shipper bar 35 to slide thereon and guided by bolts or rods 42, 43 which are extended through flanges 44, 45 on hubs 46, 47 fastened to the shipper bar 35 by set screws 48.

Between the collars 40, 41, and hubs 46, 47 are interposed springs 49, 50, which are compressed by the lug 36 engaging the collars 40, 41 until they have been compressed sufficiently to effect movement of the shipper bar 35.

The clutch mechanism as thus far described is of known construction and as heretofore practiced, the full movement of the clutch member 16 from the gear 22 to the gear 21 and vice versa was effected by the shipper bar 35 and was more or less objectionable and unreliable to ensure positive engagement of the movable clutch member with its cooperating clutch members.

To overcome the objectionable features of the clutch reversing mechanism above described, and to provide a clutch reversing mechanism which is not only positive but one which can be operated quickly and with little power, I have provided an auxiliary clutch shifting mechanism, which cooperates with the main clutch shifting mechanism, so that the latter is only required to initially move the clutch member a limited distance, as for instance about one half of its travel from one cooperating clutch member to the other, which is effected at a relatively slow speed, and thereafter the shiftable clutch member is moved for the remainder of its travel at increased speed by means of the auxiliary clutch shifting mechanism, and is engaged with its cooperating member with sufficient power to ensure a positive and firm engagement of the clutch members. In the present instance I have shown a preferred form of auxiliary clutch shifting mechanism, which consists of a V-shaped head 52 on a rod 53 which cooperates with a reversely V-shaped member or head 54 on a pin 55, see Fig. 3, which is secured by set screw 56 in a socketed boss 57 attached to the clutch shifting arm 25. The rod 53 is longitudinally movable in a hollow boss or cylinder 58 suitably attached to a stationary portion of the framework and is moved in one direction by a spring 59 which encircles the rod within the cylinder 58. The tension or pressure of the spring 59 is regulated by a threaded hollow sleeve or nut 60 and its upward movement is limited by the V-shaped member 54 with which the V-shaped head 52 is constantly in engagement. The V-shaped head 52 actuated by the spring 59 serves to keep the movable clutch member 16 in firm engagement with the cooperating clutch member 20 when the face 61 of the head 52 engages the face 62 of the member 54 as represented in Figs. 1 and 4, and also keeps the movable clutch member 16 in firm engagement with the clutch member 19 when the face 64 of the head 52 is in engagement with the face 65 of the member 54. The V-shaped member 54 is moved transversely with relation to the V-shaped head 52 by the shipper bar 35 moving the rod 27 and clutch arm 25, through one of the fingers 33 or 34, engaging the lug 32, which is effected by the springs 49, 50 as above described. As represented in Figs. 1 and 4, the clutch member 16 is engaged with the clutch member 20 and the screw shaft 14 is revolved in the proper direction to move the grinder 10 lengthwise of the cylinder $a$ in the direction indicated by the arrow 67, Fig. 1, until the grinder 10 reaches the end of the cylinder $a$, at which time the lug 36 on the grinder has compressed the spring 49 sufficiently to move the shipper bar 35 in the direction of the arrow 67 and thereby, through the finger 33 and arm 25, move the clutch member 16 away from the clutch member 20, until the apex of the V-shaped member 20 has passed by the apex of the V-shaped head 52, whereupon further movement of the movable clutch member 16 toward its cooperating clutch member 19 is effected at an increased speed by the spring 59 which slides the face 64 of the head 52 up against the face 65 of the V-shaped member 54, and engages the clutch member 16 with the clutch member 19, thereby causing the screw shaft 14 to be rotated in the opposite direction, which causes the grinder 10 to travel lengthwise of the cylinder $a$ in the direction opposite to that indicated by the arrow 67, until the grinder reaches the end of the cylinder $a$, whereupon the shipper bar 35 is moved by the spring 50, under the influence of the lug 36 on the grinder 10, and the finger 34 on the shipper bar effects disengagement of the movable clutch member 16 from its cooperating member 19 and causes the V-shaped member 54 to compress the spring 59 until the apex of the member 54 has passed by the apex of the head 52, whereupon the spring 59 causes the face 61 of the head 52 to slide upwardly on the face 62 of the member 54, and thereby move the clutch member 16 at an increased speed into engagement with the cooperating member 20 and to hold it firmly in engagement therewith, thereby reversing the rotation of the screw shaft 14, so as to cause the grinder to travel lengthwise of the cylinder $a$ in the direction indicated by the arrow 67.

It will be seen that movable clutch member 16 is disengaged from one cooperating clutch member by the main shifting mechanism represented by the shipper bar 35 and is engaged with the other cooperating member by means of the auxiliary shifting mechanism represented by the V-shaped members 52, 54.

It will also be seen that the main shifting mechanism is required to move the movable clutch member only about one half of its travel between its cooperating members, and as a result a much quicker reversal of the clutch member 16 and the parts controlled by it is effected.

The machine herein shown is provided with suitable gears for rotating the screw shaft 14 in opposite directions and as shown, the gear 22 meshes with and is driven by a gear 70 on a driving shaft 71, see Fig. 2, which has fast on it a second gear 72 which meshes with an intermediate gear 73 on a shaft 74, which intermediate gear meshes with and drives the gear 21.

In the present instance the invention is shown in a machine in which the clutch mechanism controls the reciprocation of a grinder, but it is not desired to limit the invention in this respect.

Claims:

1. The combination with a rotatable shaft, of a clutch member mounted thereon to rotate therewith and to slide thereon, co-operating clutch members normally loose on said shaft and co-operating with said movable clutch member to effect rotation of said shaft in opposite directions, an arm engaging said movable clutch member, a reciprocating actuating member, a shipper bar, spring connections between the actuating member and shipper bar, connections between the shipper bar and arm to move the latter and said movable clutch member in opposite directions for a portion of the travel of said movable clutch member, a V-shaped member attached to said arm to move therewith, a spring actuated rod provided with a V-shaped head co-operating with said V-shaped member to be moved by the latter under the influence of said shipper bar and to move said V-shaped member, and said movable clutch member independently of said shipper bar.

2. The combination with a rotatable shaft, of a clutch member mounted thereon to rotate therewith and to slide thereon, co-operating clutch members normally loose on said shaft and cooperating with said movable clutch member to effect rotation of said shaft in opposite directions, an arm engaging said movable clutch member, a reciprocating actuating member, a shipper bar actuated thereby and disengageably co-operating with said arm to move it and said movable clutch member in opposite directions for a portion of the travel of said movable clutch member, a V-shaped member attached to said arm to move therewith, a spring actuated rod provided with a V-shaped head cooperating with said V-shaped member to be moved by the latter under the influence of said shipper bar and to move said V-shaped member, and said movable clutch member independently of said shipper bar.

3. The combination with a rotatable screw shaft, of a sleeve mounted thereon and movable longitudinally thereof, a clutch member mounted on said screw shaft to rotate therewith and to slide thereon, co-operating clutch members mounted on said screw shaft and cooperating with said movable clutch member to effect rotation of said screw shaft in opposite directions, a shipper bar cooperating with said sleeve to be moved thereby and disengageably cooperating with said movable clutch member to effect initial movement thereof away from one of its co-operating clutch members and toward the other of said cooperating clutch members, and means cooperating with said movable clutch member to be actuated thereby on the initial movement of said movable clutch member and to actuate the latter to complete its movement independently of said shipper bar.

In testimony whereof, I have signed my name to this specification.

LYNDON O. RAMSDELL.